(12) United States Patent
Schmidt (10) Patent No.: US 6,307,808 B1
(45) Date of Patent: Oct. 23, 2001

(54) METHODS AND APPARATUSES FOR SEISMIC PROSPECTING

(76) Inventor: Lesley J. Schmidt, 13297 Dogwood Blossom Trail, Houston, TX (US) 77065

( * ) Notice: Subject to any disclaimer, the term of this patent is extended or adjusted under 35 U.S.C. 154(b) by 0 days.

(21) Appl. No.: 09/495,349

(22) Filed: Feb. 1, 2000

(51) Int. Cl.[7] .................................................. H04R 15/00
(52) U.S. Cl. .................................................. 367/2; 367/178
(58) Field of Search .................................. 367/2, 25, 168, 367/188, 178; 181/122; 73/866.5, 431

(56) References Cited

U.S. PATENT DOCUMENTS

| | | | |
|---|---|---|---|
| 1,951,358 | * | 3/1934 | Hayes .................................... 177/352 |
| 3,621,380 | * | 11/1971 | Barlow, Jr. ................................ 324/1 |
| 3,673,567 | * | 6/1972 | McClellan, Sr. ...................... 340/148 |
| 3,866,162 | * | 2/1975 | Florian ..................................... 340/14 |
| 4,599,713 | * | 7/1986 | Rudaz ..................................... 367/178 |
| 4,838,379 | * | 6/1989 | Maxwell ............................... 181/122 |
| 5,124,956 | * | 6/1992 | Rice et al. ............................ 367/178 |
| 5,798,488 | * | 8/1998 | Beresford et al. .................... 181/102 |
| 5,798,981 | * | 8/1998 | Littlejohn et al. ...................... 367/13 |
| 5,978,317 | * | 11/1999 | Whitener ............................... 367/178 |

* cited by examiner

Primary Examiner—Hezron Williams
Assistant Examiner—Victor J. Taylor
(74) Attorney, Agent, or Firm—The Matthews Firm (57) ABSTRACT

An improved method and apparatus are provided for improving a coupling to a substrate and orientation of seismic receivers such as a geophone to a substrate for the analysis and gathering of seismic data.

33 Claims, 8 Drawing Sheets

METHODS AND APPARATUSES FOR SEISMIC PROSPECTING

TECHNICAL FIELD

The present invention relates generally to improved methods and related apparatuses for coupling a seismic instrument to a surface. More particularly, the invention relates to a coupling for securing a geophone case in a substrate and related method of use.

BACKGROUND ART

Seismic data gathering instruments, methods and related devices are well-known in the art field, but still suffer from some common flaws and difficulties. Generally, instruments or devices, such as geophones, for sensing and transmitting seismic data on land are referred to as a geophone(s). A sub-category of geophones are referred to as marsh case geophones and are used in areas such as marshes, swamps and other areas that may or do retain water on the surface. The term geophone, as referred to herein, shall apply to any seismic detector or receiver suitable for detecting and/or receiving seismic data or vibrations from land or beneath the water. In application the geophones and marsh case geophones perform the same or similar functions in that they sense and transmit seismic data. The data is most often transmitted by a communication means such as hard wire, radio signal, infra-red signal, and/or the like to a recorder or storage instrument for analysis and/or recordation for geological, lithological, exploration and other purposes.

It is generally an object of seismic exploration to deduce the subsurface geometry and properties of a portion of land. This is typically accomplished by generating seismic energy, measuring properties of the reflected and refracted seismic energy, recording the measurements and processing the recordations. Common prior art methods employ explosions or other energy pulses to a portion of land from which exploration is desired, then measure the returned seismic energy from the reflection or refraction of the energy from subsurface formations with a geophone or a plurality of geophones spaced about in an array and transmit the measurements and process the transmissions.

One common problem associated with measuring seismic energy is the coupling of the geophone to a substrate or earthen formation. A poor coupling often distorts or renders unusable seismic data. A geophone receiver is a very sensitive instrument that can detect earth movements of less than a thousandth of an inch, and this makes it imperative that the geophone receiver has a good coupling to the substrate. The majority of methods and apparatuses utilized for coupling geophones to a substrate utilize a spike that is stomped, pounded or banged into the substrate. These methods and apparatuses result in a poor coupling that is often ineffective for accurate gathering of seismic data because the coupling becomes loose after time and can be easily dislodged by animals, humans or other disturbances such as the drying of the substrate.

Other common methods of planting and coupling geophones incorporate digging holes to couple the geophone. However, these processes are labor, time and cost restrictive because of the disturbance of the soil and time it takes to dig the hole and fill it up again. Accordingly, the prior art has sought for an apparatus and method to firmly couple a geophone to a substrate while expending as few resources as possible.

As well, the prior art has required the placing or planting of a large number of geophones to record enough accurate data for an acceptable seismic report. The placement of a large number of geophones is often time, labor and cost restrictive. Accordingly, the prior art has sought for a method and apparatus that increases coupling with a substrate as well as the efficiency of a geophone coupling, thus producing the ability to reduce the total number of geophone plants.

One prior art coupling system is disclosed in U.S. Pat. No. 5,010,531 to McNeel. That patent discloses the use of spikes to plant a geophone into the substrate. However, as previously discussed, these spikes do not couple well with the earth and do not achieve a coupling that is effective for accurate seismic measurements. As well, these coupling devices do not withstand outside shocks and trauma that are associated with geophones and geophone placement.

Another prior art apparatus that has addressed this problem is disclosed in U.S. Pat. No. 5,124,956 to Rice et al. That patent discloses a geophone configuration that includes an elongated extension or spike that couples the geophone to the soil by utilizing an enlarged bow section at or near the end of the spike implanted into the soil. This apparatus fails to firmly engage the substrate throughout the insertion hole and, in fact, requires a larger hole than the spike thereby causing disturbance with the soil in an area greater than that required for the spike. Therefore, the apparatus disclosed in the patent does not solve the problem of coupling a geophone to soil while disturbing as little soil as possible. As well, this prior art method does not provide a coupling of a geophone case to the soil that is capable of withstanding shocks and trauma associated with placement of the geophone. Accordingly, the art field desires an apparatus and method of coupling a geophone to a substrate that firmly couples the geophone to the substrate while disturbing only a portion of the substrate necessary to insert the coupler and a geophone case that can withstand shocks and trauma. Moreover, this prior art apparatus does not reduce or eliminate vibrations of a geophone case as is caused by the wind. Accordingly, the art field is in search of an apparatus that reduces vibrations across a geophone case while improving the geophone coupling to a substrate.

A prior art solution to the coupling problem that has produced good results is disclosed in U.S. Pat. No. 1,951,358. That patent discloses to a device with a conical or pyramidal base with a vibrational measuring system mounted on the top of the base. As well, this patent discloses the use of a spiral flange running along the base. However, this patent teaches and discloses placing the vibrational measuring systems not in contact with a flat surface above the ground, but rather above the base. Placement of the vibrational measuring systems as this patent teaches results in a distortion of a signal and causes untrue and inaccurate results to be taken. Further, this patent teaches a device for measuring vibrational energy that is not equivalent to a geophone of this patent. As well, the base disclosed in this patent is from four to five inches at its widest portion tapered down to the point. A hole with a diameter of four to five inches is entirely to large and creates great risk of injury to animals and humans after the device is removed from the hole. This patent does not teach a coupler with a narrow width that creates a small hole that may be easily remediated. Accordingly, the art field is in need of a device and method that firmly couples a geophone to a substrate while allowing for accurate and reliable measurements with proven vibrational measuring systems and not greatly disturbing the substrate or leaving large holes within the substrate.

Additionally, a common problem in the art field is the proper positioning of geophone on a substrate for data gathering. In order to properly position a geophone case for seismic exploration, in most circumstances, a level substrate is desired. Accordingly, the art field has sought for a device that will facilitate the leveling of a substrate for proper geophone positioning and placement.

SUMMARY OF THE INVENTION

The present invention generally relates to improved methods and apparatuses for coupling seismic instruments or recorders to a substrate, related cases for such instruments or recorders and related devices.

This summary is not intended to be a limitation with respect to the features of the invention as claimed, and this and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

GENERAL DESCRIPTION AND PREFERRED MODE FOR CARRYING OUT THE INVENTION

The following terms are defined by the definitions accompanying them. As used herein, the term "couple"", "coupling," and "coupled" means and refers to attaching, securing, mating, and/or the like. As used herein, the term "substrate" means and refers to soil, earth, rock, and/or other surface on which is desired a mounting of a geophone.

Figure 1:
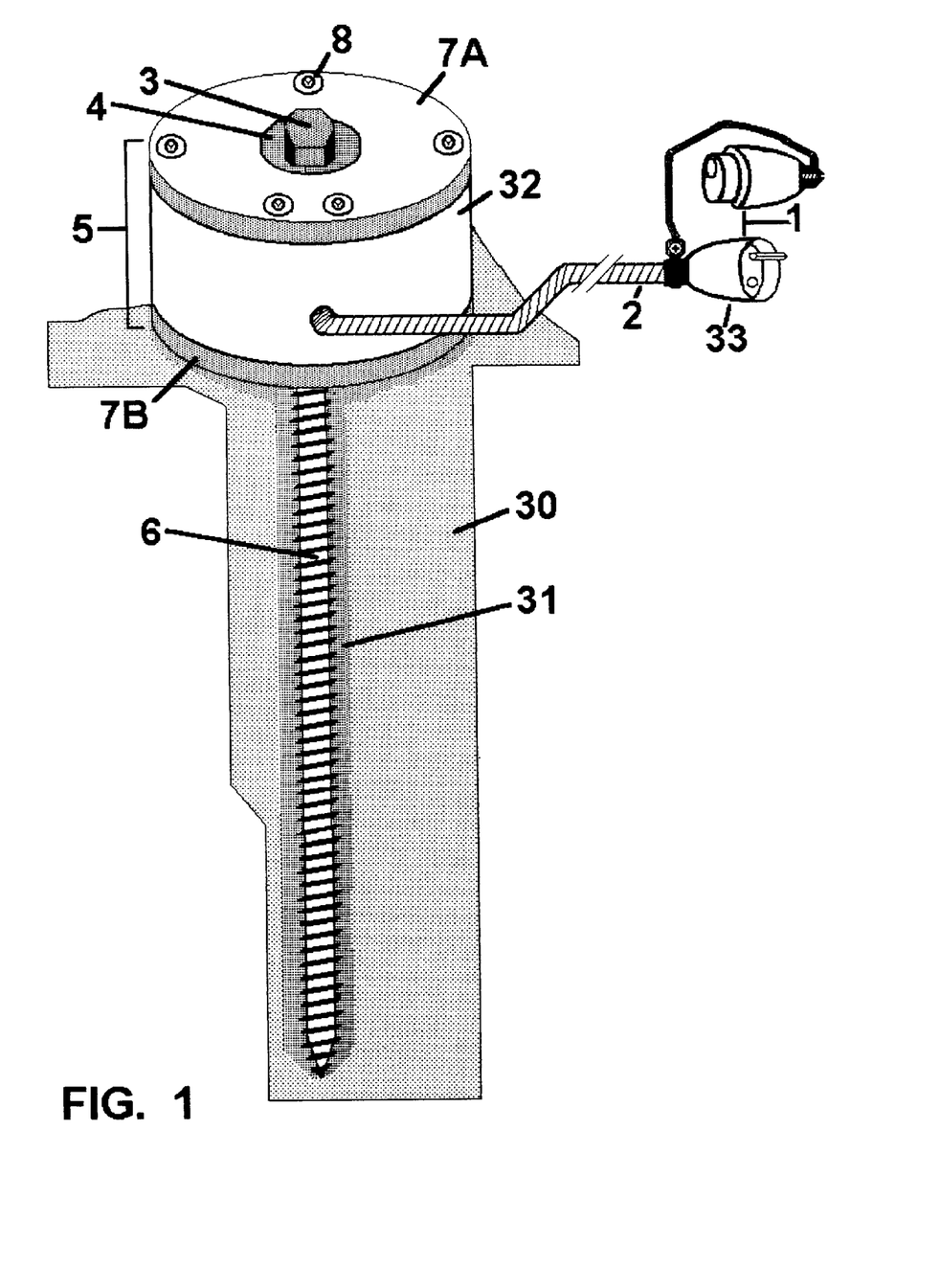
FIG. 1 is an illustration of an embodiment of a geophone of the present invention.

Referring now to FIG. 1, an illustration of an embodiment of a geophone of the present invention, attributes of the present invention may be seen. An embodiment of a manner of construction comprises a head of bolt 8 that extends across geophone case 5 and secures top plate 7a, interior section 32, and bottom plate 7b of geophone case 5. (A manner of coupling an embodiment of a geophone case of the present invention to a substrate will be more fully described in FIG. 2). This embodiment discloses 5 bolts 8 extending through geophone case 5, however, any number of bolt(s) 8 may be used for securing geophone case 5.

A coupling 6, or anchor bolt, is shown running or passing through geophone case 5 and securing geophone case 5 to a substrate 30. Coupling 6 is composed of a first end, a second end, and a middle portion. Generally, the first end is a coupler head 3, the second end is an end for insertion into a substrate, and a middle portion is an elongated portion 31. Coupler head 3 may be adapted for engagement. In various embodiments, the elongated portion 31 is threaded. However, various other embodiments of the present invention may utilize other enhanced friction formations such as notches, intermittent threads or extending spikes along elongated portion 31. A washer 4 is shown below coupler head 3 to assist in mating geophone case 5 with coupling 6 and protect embodiments of the present invention from possible scarring that may result because of friction between case 5 and coupling 6. However, other embodiments of the present invention do not utilize a washer 4. Coupling 6 of this embodiment threadedly engages substrate 30 to form a secure plant and base for geophone case 5 that is capable of resisting shocks, trauma and vibrations commonly associated with various operations of geophones.

Various embodiments of the present invention utilize a coupling 6 that is 1 to 24 inches long for engaging the substrate. Other embodiments utilize a coupling 6 that is 8 to 12 inches long. However, coupling 6 may be of any length depending upon an operator's preference. For example, and not by way of limitation, a shorter coupling 6 may be desired in locations where the substrate is hard. Likewise, in areas where the substrate is extremely soft a longer coupling 6 may be desired. However, such desires are not limitations on the present invention, but merely serve as examples of uses.

Referring back to FIG. 1, a connector line 2 extends from geophone case 5 and is utilized for connection about head connector 1 to an instrument for recording or processing seismic data collected from a geophone or geophones (not shown) within geophone case 5. Such instruments are common in the art and any instrument may be used. In an embodiment, head connector 1 is in a dust cover 33 to prevent contaminants from entering and/or interfering with the connection of head connector 1 to an instrument with a steel metal-flex hosing protector sleeve around leader wire, 14 to 24 inches long as connector 2. Other embodiments utilize a connector 2 that may be integral with a portion of case 5 or may be recessed within a portion of case 5. However, such manners of connection are extremely common in the art and all such manners are considered fully disclosed.

Figure 2:
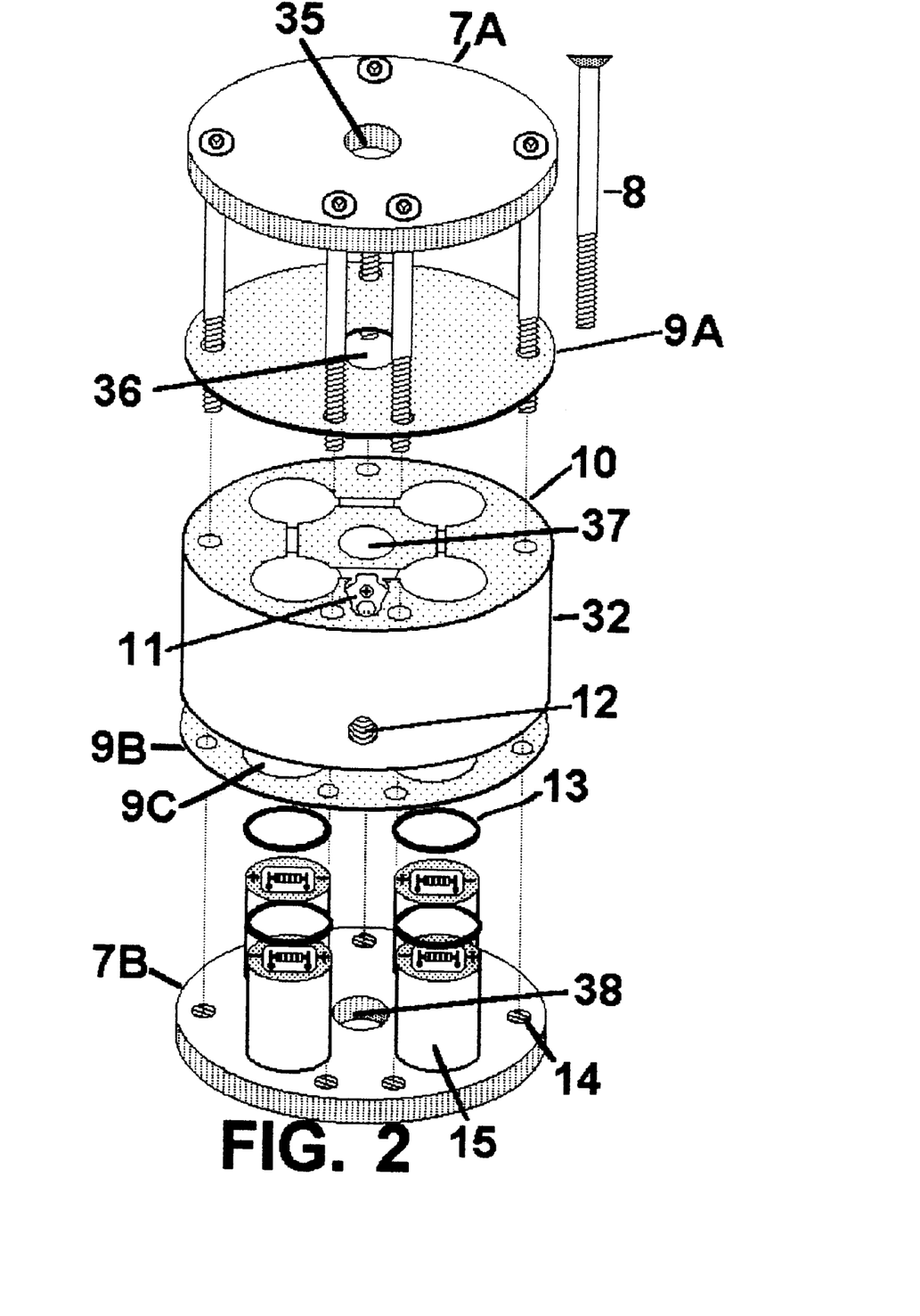
FIG. 2 is an illustration of a construction of the embodiment of FIG. 1

Now referring to FIG. 2, an illustration of a construction of the embodiment of FIG. 1, a construction of an embodiment of geophone case 5 may be observed. Geophone case 5 may be composed of an upper plate 7a, a lower plate 7b, an in interior section 32, bolt(s) 8, first washer wafer 9a, second washer wafer 9b and geophone(s) 15. This embodiment is secured together by bolt(s) 8 extending through and secured to upper plate 7a along a periphery of upper plate 7a. In an embodiment, the periphery is an outer periphery. In another embodiment, the periphery is not an outer periphery. Bolt(s) 8 may then extend through a first washer wafer 9a, through interior section 32, through second washer wafer 9b and secured to lower plate 7b. Various embodiments of the present invention utilize a threaded engagement to secure bolt(s) 8 to lower plate 7b at threaded recess 14. However, other manners of connection are common in the art and may be used with this invention, such as welding, adhesives and nailing.

In other embodiments, various portions of case 5 may be substituted, combined and/or the like. For example, various embodiments do not use washer wafers. Furthermore, other embodiments may incorporate a lower and/or upper plate that is integral with an interior section. As is illustrated, the manner of construction of case 5 utilizes methods common in the art and such additional embodiments will be readily apparent to those of ordinary skill in the art.

In this embodiment, a passage or throughpassage is formed through geophone case 5 by an alignment of hole 35 in upper plate 7a, hole 36 in first wafer washer 9a, hole 37 in interior section 32, a hole in second wafer washer 9b (not shown) and hole 38 in lower plate 7b. While this embodiment has shown and described a single hole located about the center of geophone case 5, other embodiments utilize a plurality of passages or throughpassages that may be positioned in varying locations about geophone case 5. Further, holes 35, 36, 37 and 38 may be threaded for engagement either singularly or in combination.

Various embodiments utilize various materials for construction of lower plate 7b such as metal; for example, but not limited to aluminum, brass, tine, steel, iron and/or alloys of the same. However, other embodiments utilize materials of poly vinyl chloride, or other natural or synthetic material. The material chosen may depend on the conditions of installation. In areas where there is a high concentration of grazing animals, such as, but not limited to, prairie land or grassland, a hard material such as a metal may be desired to resist being crushed, destroyed and/or distortion to a signal due to an animal stepping upon geophone case 5. As well, a strong material may be desired to withstand normal handling procedures associated with seismic data gathering, such as the installers handling of the geophone(s). While a cylindrical structure of geophone case 5 is disclosed, the present invention envisions the use of any variety of structure such as quadrangular, triangular, polygonal or any other shape. Construction of such other various shaped of case 5 is within the ordinary skill in the art.

In an embodiment, geophone 15 is mounted to lower plate 7b to be in close proximity to a substrate when geophone case 5 is planted. Any number of geophone(s) 15 may be used. An embodiment utilizes four geophone(s) 15 spaced evenly about lower plate 7b. It may be found that use of more than one geophone will reduce a total number of geophones required to be planted for the recordation of seismic data because multiple signals may be taken from one case 5. Furthermore, various embodiments connect geophones in alternate orientations such that in an embodiment with multiple geophones, data may be collected at varying angles of orientation. For example, a geophone 15 may be at any degree of inclination between, and including, horizontal and vertical orientations within case 5.

Geophone(s) 15 may be fixedly mounted or releasably mounted to lower plate 7b by any manner common in the art such as adhesives, tightening, threading and/or the like. In an embodiment, geophone 15 is kept in a mounted position by an assembly of geophone case 5 for easy removal and repair of individual geophone(s) 15. Geophone(s) 15 are well known in the art and the particular geophone selected for a particular application may vary. Accordingly, the present invention envisions the use of all geophone(s) within the art field.

In an embodiment, a second gasket 9b is inserted about lower plate 7b and geophone(s) 15. Various embodiments of the present invention utilize a second gasket 9b to improve durability and water-tightness to geophone case 5. Accordingly, gasket 9b may be constructed of material common in the art such as, but not limited to, plastic, rubber, metal and the like. Other embodiments of gasket 9b have a hole 9c cut from the gasket about the size of geophone 15 so that it may be in direct contact with lower plate 7b.

Interior Section 32 is a body for geophone(s) 15. In preferred embodiments, interior section 32 is a solid portion adapted for receiving geophone(s) 15. However, interior section 32 may be hollow or not included. Various embodiments utilize a polyvinyl chloride, but any material common in the art may be used such as a metal, plastic, wood or rubber. Various embodiments are constructed such that interior section 32 is water proof or water tight.

Various embodiments may utilize further trauma or shock reducing structures to assist in an acquisition of seismic data. For example, an O-ring 13 may be used about geophone 15 to further aid in a reduction of shock to the geophone. In an embodiment, O-ring(s) 13 are placed on top of the geophone 15 to aid in reducing the movement of geophone 15 when the instrument is assembled and/or used.

The connection of case 5 to other instruments and/or seismic equipment may be of any manner common in the art. Likewise, internal connections and assemblage of embodiments of the present invention may be of any manner common n the art. In an embodiment, interior section 32 may incorporate an anchor pin screw(s) for wiring purposes of the geophone(s) 15. Common methods of connection use a leader wire and a connection point 12. However other manners of connection will be readily apparent to those of ordinary skill in the art.

Figure 3:
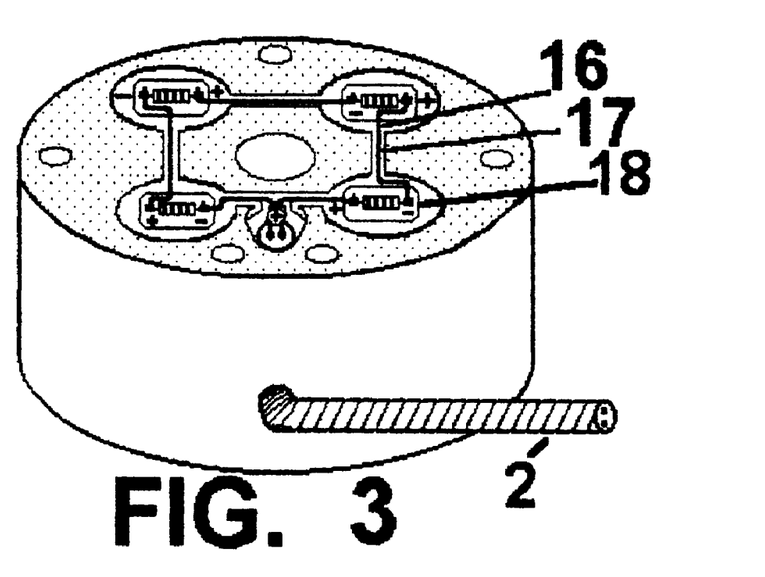
FIG. 3 is an illustration of an interior section of an embodiment of the present invention.
Figure 4:
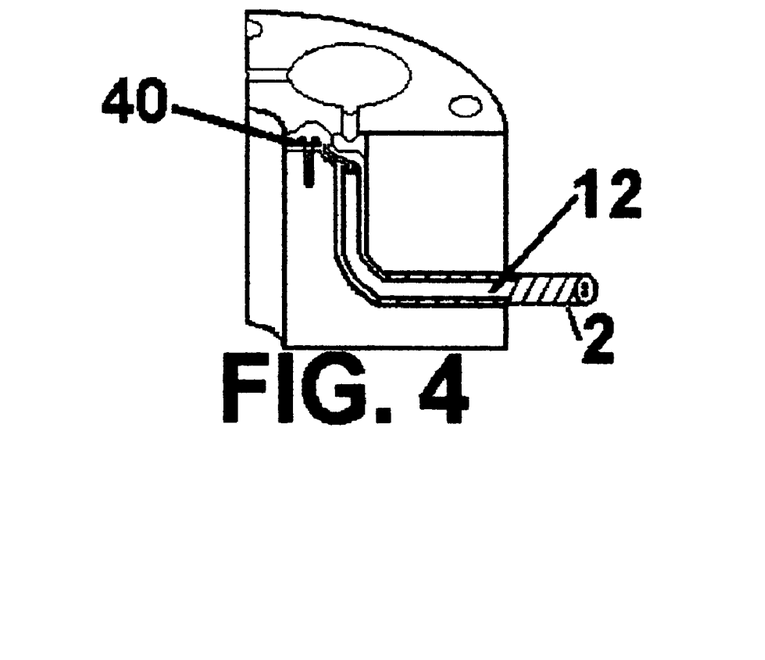
FIG. 4 is an illustration of a cut-away view a connector of an embodiment of the present invention.

Referring to FIG. 3 and FIG. 4, an embodiment of a manner of wiring geophone(s) 15 within interior section 32 is disclosed. FIG. 3 illustrates inter connecting wires 16 pass through a groove 17 in interior section 32. An embodiment utilizes a wiring in series as depicted by reference numeral 18 to achieve a high output signal. However, any manner of wiring of geophone elements may be utilized. FIG. 4 illustrates an embodiment of a form connection for the wiring of FIG. 3. A screw pin holder 40 may be used at an intersection of wires to assist in coupling the wires into connection point 12. As well, other embodiments may use a metal flex wire as is shown as connector 2. However, connecting wires within geophones is well known in the art and various methods may be used and still be within the scope of the present invention.

Now referring back to FIG. 2, in an embodiment, a first gasket 9a is inserted above interior section 32 and upper plate 7a.

Upper plate 7a may be constructed of a similar material as lower plate 7b for like reasons. Bolt(s) 8 are constructed of a metal preferably to add enhanced strength and resiliency to geophone case 5. Accordingly, various embodiments, when all components are assembled, a geophone case is formed that has an enhanced resistance to compression from shock, trauma, vibration, and/or the like.

To position a geophone case 5, an operator merely needs to engage coupling 6 with a substrate. In an embodiment, this is accomplished by twisting or rotating coupling 6 such that it threadedly engages the substrate, forming a firm bond capable of resisting shocks, traumas, vibrations and/or the like normally associated with the placement and/or use of geophones. In an embodiment, coupling 6 is partially within a portion of hole 35 such that a portion of coupling 6 extends out hole 38. A portion of coupling 6 extending from case 5 may then be engaged with a substrate.

Various embodiments of the present invention may engage a substrate in a variety of manners. For example, and not by way of limitation, forcing, pushing, twisting, threading, inserting, and/or the like. For ease of description, the insertion and/or coupling of coupling 6 to a substrate will be referred to as "twisting," however all other manners of coupling are fully included in such explanation. Twisting of a coupling of a geophone case of the present invention may be by any means common in the art such as by hand, wrench, socket; with or without extensions, drill, or other power means.

Figure 9:
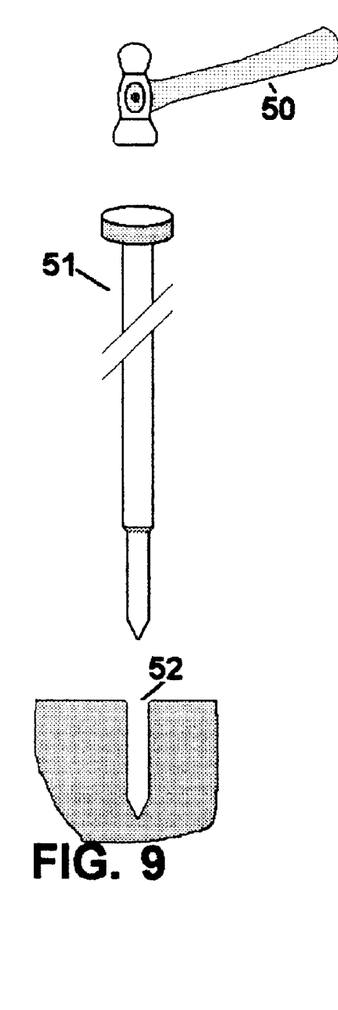
FIG. 9 is an illustration of an embodiment of a method and related devices for forming a path for a coupler for various embodiments of the present invention.
Figure 10:
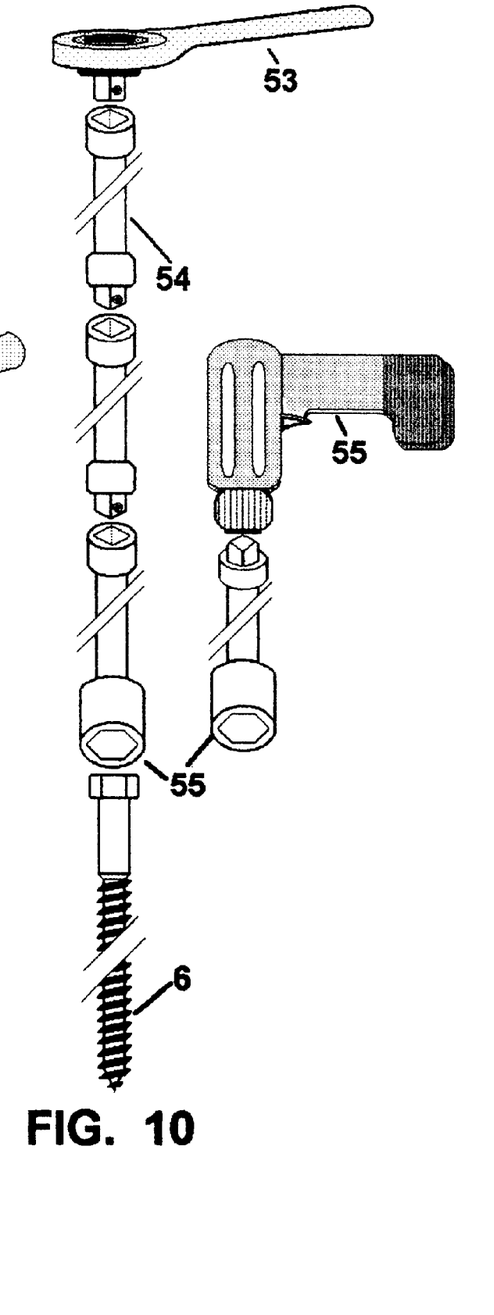
FIG. 10 is an illustration of an alternate embodiment of a method and related devices for forming a path for a coupler for various embodiments of the present invention.

In substrate that is particularly difficult to achieve coupling, a nail or other extension may first be inserted into the ground as depicted in FIG. 9, an illustration of an embodiment of a method and related devices for forming a path for a coupler for various embodiments of the present invention. Further, FIG. 10, illustrates an alternate embodiment of a method for forming a path for a coupler, illustrates other methods and apparatuses for insertion of coupling 6.

Figure 5:
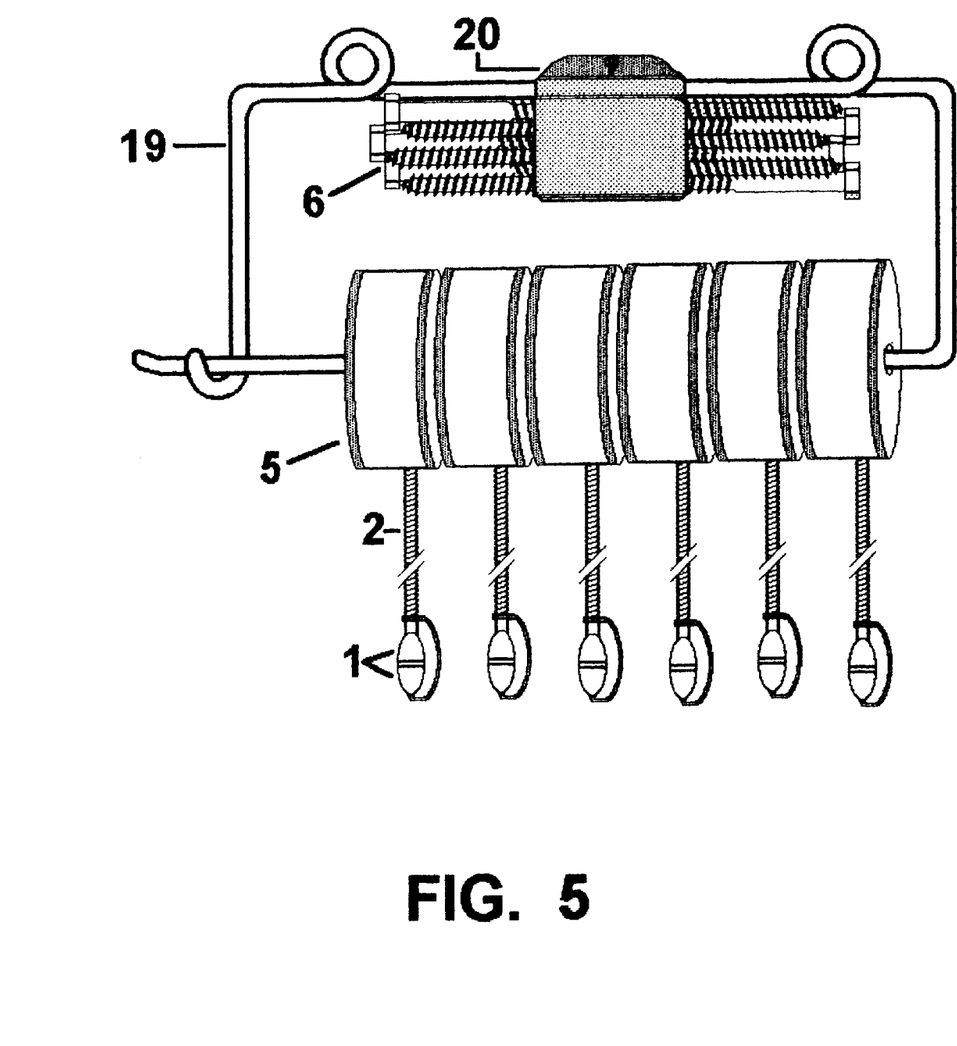
FIG. 5 is an illustration of an apparatus for transporting multiple embodiments of the present invention to a site.

Referring now to FIG. 5, an illustration of an apparatus for transporting multiple embodiments of the present invention to a site, it may be seen that embodiments of the present invention are adapted for ease of transportation to a site. In this embodiment, a carrier pin 19 is wound around and through a geophone case 5 and through a strap 20. In various embodiments, strap 20 may be constructed of a metal, rubber, plastic or would such that the material selected is able to close about and secure coupling(s) 6 for transport. A through passage in geophone case(s) 5 provides a convenient manner to attach and carry the geophone case(s) 5 to a site. In an embodiment a plug connector 1 is attached to an end of connector 2 for ease of coupling to a seismic instrument.

Figure 6:
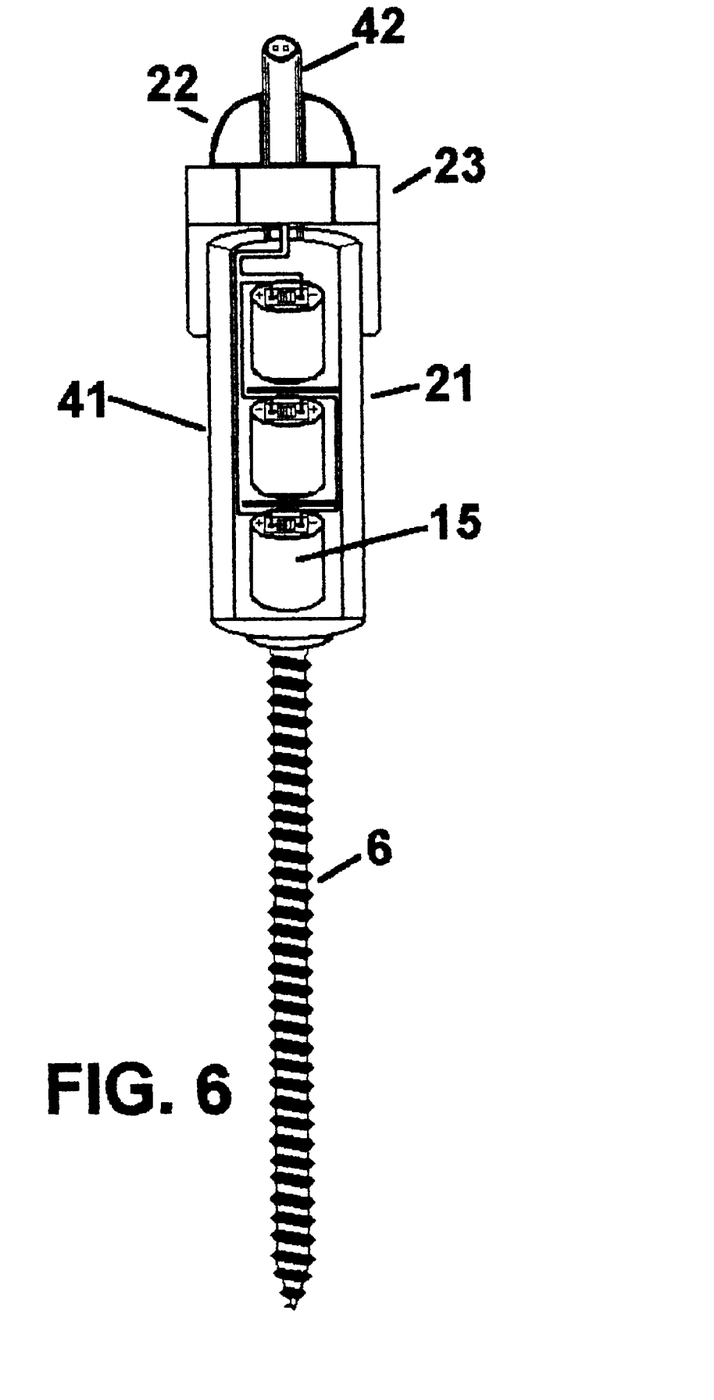
FIG. 6 is an illustration of an alternate embodiment of the present invention.

Referring now to FIG. 6, an illustration of an alternate embodiment of the present invention, a marsh type geophone is depicted. However, this embodiment may be used in environments other than marshes. This embodiment is illustrative of the adaptability of various embodiments of the present invention. This embodiment incorporates coupling 6 as an integral part of an alternate geophone case 41. Coupling 6 may be secured to alternate geophone case 41 by any means common in the art such as an adhesive, threads, or the coupling may formed from the material of case 21. In this embodiment, Case 21 holds and allows to be wired a single or a plurality of geophone(s) 15 in a water tight enclosure and/or construction. Upper portion 23 is adapted for engagement to facilitate insertion of coupling 6 into a substrate. Upper portion 23 also may incorporate a hex head connector 22 for other manners of insertion. An alternate connector 42 extends above upper portions 22 and 23 and is used for connecting the geophone to an instrument by any means common in the art such as wires or transmission. However, various other embodiments of the present invention do not have a portion of case 41 that is adapted for engagement.

The embodiment depicted in FIG. 6 may be inserted as already described for the previous embodiments, i.e. by a threaded engagement with the substrate.

Figure 7:
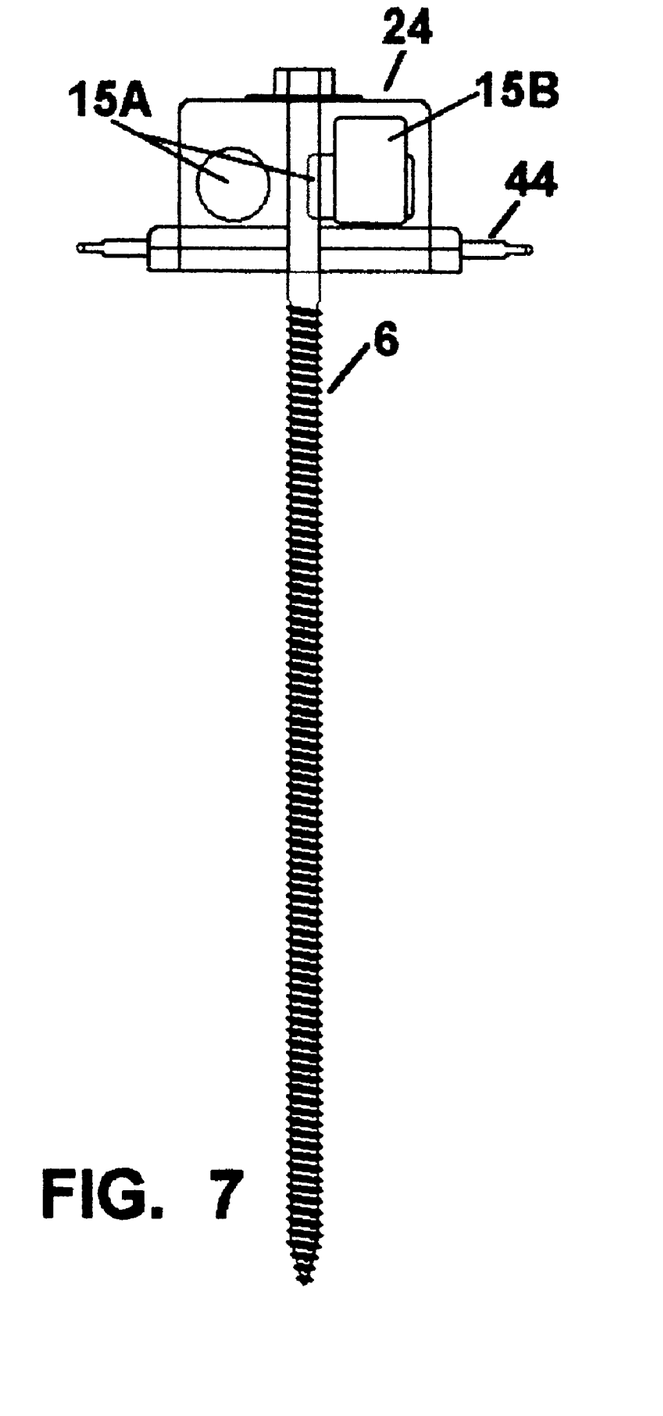
FIG. 7 is an illustration of an alternate embodiment of the present invention.

Referring now to FIG. 7, an illustration of an alternate embodiment of the present invention, a second alternate geophone case 24 is disclosed for holding both vertical geophone(s) 15b and horizontal geophone(s) 15a. Coupling 6 may be secured to geophone case 24 as already shown and described to facilitate a threaded engagement with a substrate. Connection 44 may be used to connect a plurality of geophones together, for connection to an instrument, or for transmission to the aforementioned instruments and/or other geophones. Geophone case 24 is may be watertight, but any construction is adequate and within the scope of this invention.

Figure 8:
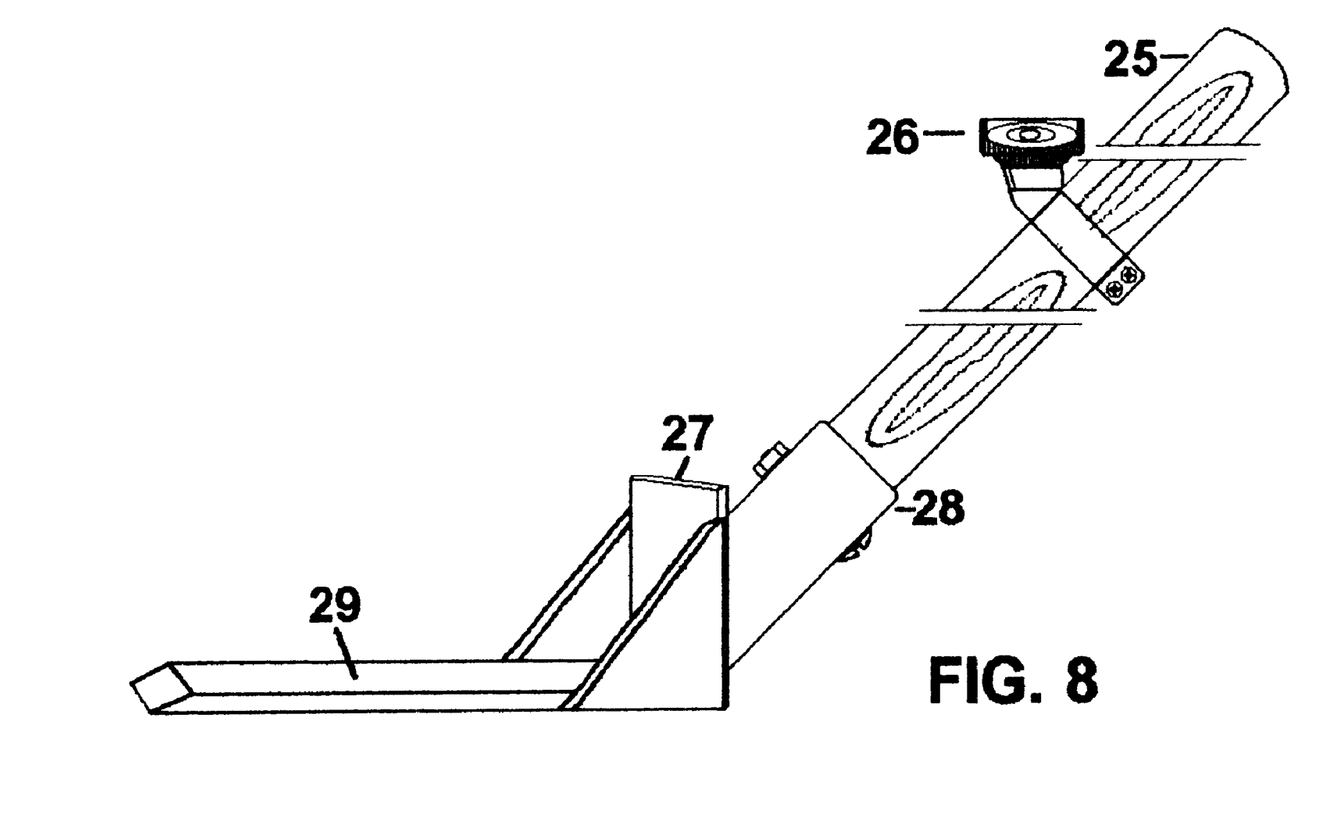
FIG. 8 is an illustration of an embodiment of a device for leveling or planing a substrate.

Referring now to FIG. 8, an illustration of an embodiment of a device for leveling or planing a substrate, a general orientation of an embodiment is disclosed. Base plate 29 is generally planar, but may be at any angle desired by an operator and is connected to a kick plate 27 for removing or leveling the substrate by kicking, stomping or applying force to the kick plate 27. In a preferred embodiment, a handle 25 is adjustably attached to base plate 29 and/or kick plate 27 to allow an operator to easily maneuver the device from a standing or partially standing position. A preferred angle of attachment of the handle to the plate is 45 degrees. A level 26 is attached to handle 25 to allow an operator to determine when the substrate is level. However, level 26 may be mounted to kick plate 27 or other areas on base plate 29 to facilitate in determining when the substrate is leveled to a chosen orientation. Other embodiments of this device do not use a handle and only incorporate a level 26, a kick plate 27 and a base plate 29.

While a single method and a few embodiments of devices have been shown and described, it will be understood that the invention is not limited thereto, since many modifications may be made and will become apparent to those of ordinary skill in the art.

What is claimed is:

1. A geophone case, comprising:
   a top plate and a bottom plate secured about an interior portion containing at least one geophone for seismic measurements and a passage that extends through the top plate, the interior portion and the bottom plate; and,
   at least one at least partially threaded coupling extending in at least a portion of the passage.

2. The geophone case of claim 1 wherein the top plate and the bottom plate is secured by at least one member.

3. The geophone case of claim 1 wherein the at least partially threaded coupling extends from a portion of the top plate and threadedly engages a portion of the bottom plate.

4. The geophone case of claim 1 wherein the top plate and the bottom plate is rigidly secured by a plurality of couplings such that a height of the interior portion remains substantially constant.

5. The geophone case of claim 1 wherein the interior portion further comprises a housing, the geophone secured about the housing.

6. The geophone case of claim 1 wherein the housing is sealed whereby moisture is substantially prevented from entering the housing.

7. The geophone case of claim 1 further comprising a communication means.

8. The geopbone case of claim 1 wherein the coupling has a first end, a second end and a middle portion extending through at least a portion of the passage.

9. The geophone case of claim 8 wherein the coupling is a bolt.

10. The geophone case of claim 1 wherein the coupling is adapted to be threadedly engaged with the substrate.

11. The geophone case of claim 8 wherein the first end is larger than the passage.

12. The geophone case of claim 8 wherein the first end is adapted for engagement.

13. The geophone case of claim 8 wherein second end is adapted for insertion into the substrate.

14. A geophone case comprising a shell, having an upper surface, a lower surface and a side surface, containing at least one geophone and a throughpassage that extends at least partially across the shell adapted for an insertable, at least partially threaded, coupling member for coupling to a substrate.

15. The geophone case of claim 14 further comprising a coupling member with a first end, a second end and a body.

16. The geophone case of claim 15 wherein the body is at least partially threaded.

17. The geophone case of claim 15 wherein the coupling member is fixedly attached about the second end to the shell along the lower surface.

18. The geophone case of claim 15 wherein the coupling member is engageably attached about the second end to the lower surface.

19. The geophone case of claim 15 wherein the coupling member is threadedly engaged with the shell.

20. The geophone case of claim 15 wherein the through passage is a location for attachment of the coupling whereby the coupling extends from the lower surface of the geophone case.

21. A method for firmly securing a geophone comprising the steps of:

obtaining a geophone with a geophone coupling that is adapted for threaded engagement with a substrate;

placing the gephone along a portion of a substrate where seismic data is desired;

engaging the coupling with the substrate; and, inserting the coupling at least partially into the substrate.

22. The method of claim 21 further comprising the step of measuring seismic data from the substrate.

23. The method of claim 21 wherein a plurality of geophones are coupled to the substrate.

24. The method of claim 21 further comprising the step of adjusting an orientation of the substrate.

25. The method of claim 21 wherein the orientation of the substrate is adjusted to a planar orientation.

26. The method of claim 21 wherein adjusting the orientation of the substrate is adjusted with a device comprising a plane that is adapted for removal of a substrate, a foot pedal connected to the plane and a level connected about the shovel to indicate an orientation of the plane.

27. The method of claim 24 wherein the foot pedal further comprises a handle.

28. The method of claim 21 further comprising drilling a hole into the substrate.

29. The method of claim 28 wherein drilling a hole into the substrate further comprises selecting a drill bit to penetrate the substrate.

30. The method of claim 28 further comprising drilling the coupling to the substrate and securing the geophone.

31. The method of claim 21 wherein the step of inserting the geophone further comprises the step of twisting the geophone.

32. The method of claim 21 wherein the geophone threadedly engages the substrate.

33. The method of claim 21 wherein the step of inserting the geophone further comprises the step of twisting the coupling.

* * * * *